United States Patent
Kuo

(10) Patent No.: US 9,249,914 B2
(45) Date of Patent: Feb. 2, 2016

(54) CONNECTOR STRUCTURE FOR A SCHRADER (AMERICAN) VALVE/PRESTA (FRENCH) VALVE

(71) Applicant: Birzman Corp., Changhua County (TW)

(72) Inventor: Chung-Tsun Kuo, Changhua County (TW)

(73) Assignee: Birzman Corp., Changhua County (TW)

( * ) Notice: Subject to any disclaimer, the term of this patent is extended or adjusted under 35 U.S.C. 154(b) by 97 days.

(21) Appl. No.: 14/260,668

(22) Filed: Apr. 24, 2014

(65) Prior Publication Data
US 2014/0326345 A1 Nov. 6, 2014

(51) Int. Cl.
*F16L 37/28* (2006.01)
*F16L 37/12* (2006.01)
*F16L 37/32* (2006.01)
*B60C 29/06* (2006.01)
*B60S 5/04* (2006.01)

(52) U.S. Cl.
CPC .............. *F16L 37/28* (2013.01); *F16L 37/1215* (2013.01); *F16L 37/32* (2013.01); *B60C 29/06* (2013.01); *B60S 5/04* (2013.01); *Y10T 137/9029* (2015.04)

(58) Field of Classification Search
CPC ............ B60C 29/06; B60S 5/04; F16L 37/28; F16L 37/32; F16L 37/1215; Y10T 137/9029
See application file for complete search history.

(56) References Cited

U.S. PATENT DOCUMENTS

| 2,837,350 A * | 6/1958 | Druge | ............... F16K 15/20 137/231 |
| 7,032,613 B2 * | 4/2006 | Delorme | ............... F16L 37/05 137/223 |

* cited by examiner

*Primary Examiner* — Craig Schneider
*Assistant Examiner* — Patrick Williams
(74) *Attorney, Agent, or Firm* — Alan D. Kamrath; Kamrath IP Lawfirm, P.A.

(57) ABSTRACT

A connector structure for a Schrader (American) valve or a Presta (French) valve contains an air connector connected with a Schrader (American) valve or a Presta (French) valve. The Schrader (American) valve includes Schrader (American) threads and a Schrader (American) inlet part; the Presta (French) valve includes Presta (French) threads and a Presta (French) inlet part. The air connector contains a body including a Schrader (American) inserting hole with a Schrader (American) screwing section, a Presta (French) inserting hole, a movable groove, an air intake, and at least one through orifice; a limiting block including a retaining segment with plural locking teeth and including a defining segment; a control set disposed on the body and controlling the defining segment; a stopping rod mounted in and limited by the movable groove, the stopping rod including a confining slot and an abutting segment which correspond to the Schrader (American) inserting hole.

8 Claims, 9 Drawing Sheets

CONNECTOR STRUCTURE FOR A SCHRADER (AMERICAN) VALVE/PRESTA (FRENCH) VALVE

BACKGROUND OF THE INVENTION

1. Field of the Invention

The present invention relates to a connector structure for a Schrader (American) valve or a Presta (French) valve, and more particularly to an air connector which is connected with the Schrader (American) valve or the Presta (French) valve to inflate the air.

2. Description of the Prior Art

Conventional air inflating manners contains retaining an air connector with an air valve by ways of a compression rubber and by screwing male threads with female threads. However, when the air connector retains the air valve, the air valve cannot be retained tightly in an air inflating process at a high pressure, and a user has to manually screw the male threads with the female threads with two hands troublesomely.

As illustrated in FIGS. 10 and 11, a conventional air connector 70 for a Schrader (American) valve or a Presta (French) valve contains:

a body 71 including an air intake 711 communicating with an air outlet 712;

a connecting member 72 fixed in the air outlet 712 and connecting with a Schrader (American) valve 2 or a Presta (French) valve 3 to inflate the air;

a first spring 73 mounted in the body 71;

a driving member 74 fixed in the body 71 and pushed by the first spring 73 to move outward, the driving member 74 having a resilient locking segment 741;

a second spring 75 disposed in the driving member 74;

a driven rod 76 mounted in the driving member 74 and pushed by the second spring 75 to move toward the resilient locking segment 741, and the driven rod 76 having a limiting slot 761;

a rotating stem 77 fixed on the body 71 and controlling the locking segment 741 of the driving member 74.

When desiring to connect the Schrader (American) valve 2, the driven rod 76 is abutted by the second spring 75 to control the rotating stem 77, and the resilient locking segment 741 retains in the limiting slot 761 so that the driven rod 76 is fixed at a front end of the body 71, and when the Schrader (American) valve 2 is inserted into the air outlet 712, it is opened by pressing the driven rod 76 to inflate the air.

When desiring to couple with the Presta (French) valve 3, the driven rod 76 is abutted by the second spring 75, and the Presta (French) valve 3 is inserted into the air outlet 712, thereafter the driven rod 76 is pushed by the Presta (French) valve 3, the rotating stem 77 is rotated so that the resilient locking segment 741 retains in the limiting slot 761. In the fact, when the driven rod 76 is pushed by the Presta (French) valve 3, an end portion of the Presta (French) valve 3 retracts inwardly, hence the resilient locking segment 741 cannot retain with the Presta (French) valve 3 (as illustrated in FIGS. 11 and 12), and the air is inflated at a lower pressure. In other words, when inflate the air at a high pressure, the air connector 70 is sprayed away by the high pressure, and the Schrader (American) valve 2 or the Presta (French) valve 3 is inserted by pressing the body 71 with one hand and by rotating the rotating stem 77 with the other hand, thereby causing inconvenient operation.

The present invention has arisen to mitigate and/or obviate the afore-described disadvantages.

SUMMARY OF THE INVENTION

The primary objective of the present invention is to provide a connector structure for a Schrader (American) valve or a Presta (French) valve in which an air connector is connected with a Schrader (American) valve or a Presta (French) valve easily by controlling a stopping rod to move forward or backwardly.

Another objective of the present invention is to provide a connector structure for a Schrader (American) valve or a Presta (French) valve in which the air connector is connected with the Presta (French) valve by engaging plural locking teeth with a limiting block or by disengaging the plural locking teeth from the limiting block quickly.

To obtain the above objectives, a connector structure for a Schrader (American) valve or a Presta (French) valve provided by the present invention contains an air connector connected with a Schrader (American) valve or a Presta (French) valve.

The Schrader (American) valve includes Schrader (American) threads and a Schrader (American) inlet part; the Presta (French) valve includes Presta (French) threads and a Presta (French) inlet part.

The air connector contains a body including a Schrader (American) inserting hole with a Schrader (American) screwing section, a Presta (French) inserting hole, a movable groove, an air intake, and at least one through orifice; a limiting block including a retaining segment with plural locking teeth and including a defining segment; a control set disposed on the body and controlling the defining segment; a stopping rod mounted in and limited by the movable groove of the body, the stopping rod including a confining slot and an abutting segment which correspond to the Schrader (American) inserting hole.

DETAILED DESCRIPTION OF THE PREFERRED EMBODIMENTS

The present invention will be clearer from the following description when viewed together with the accompanying drawings, which show, for purpose of illustrations only, a first embodiment in accordance with the present invention.

Figure 1:
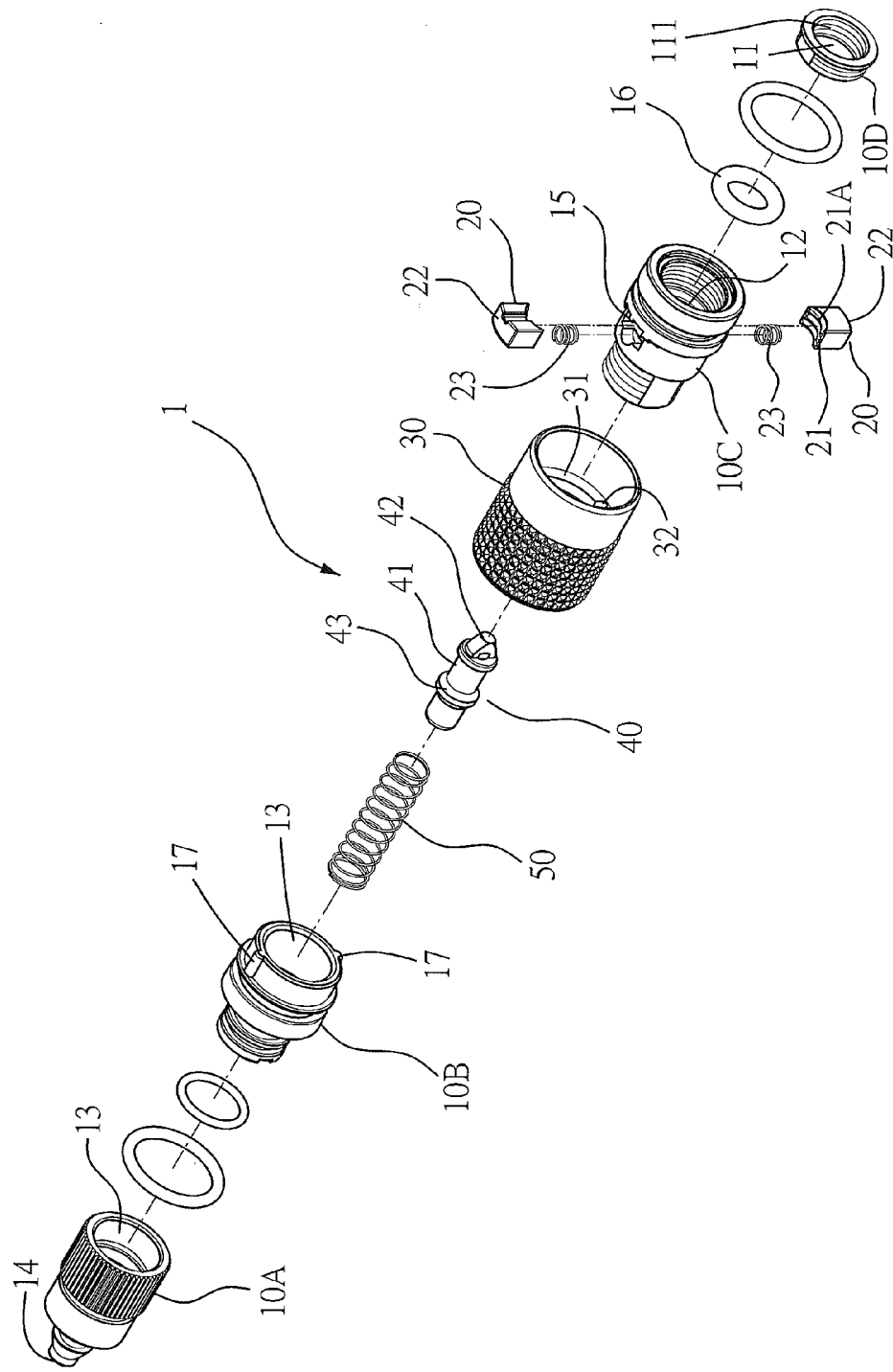
FIG. 1 is a perspective view showing the exploded components of a connector structure for a Schrader (American) valve or a Presta (French) valve according to a preferred embodiment of the present invention.
Figure 2:
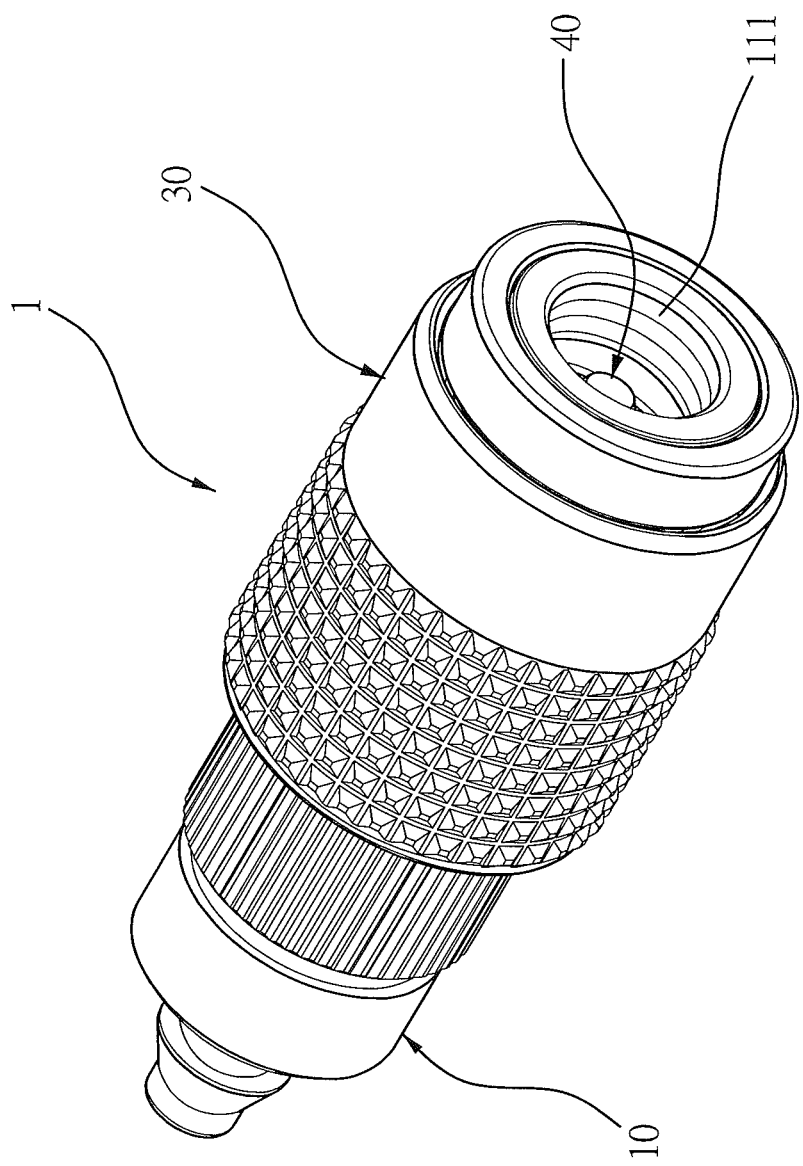
FIG. 2 is a perspective view showing the assembly of the connector structure for the Schrader (American) valve or the Presta (French) valve according to the preferred embodiment of the present invention.
Figure 3:
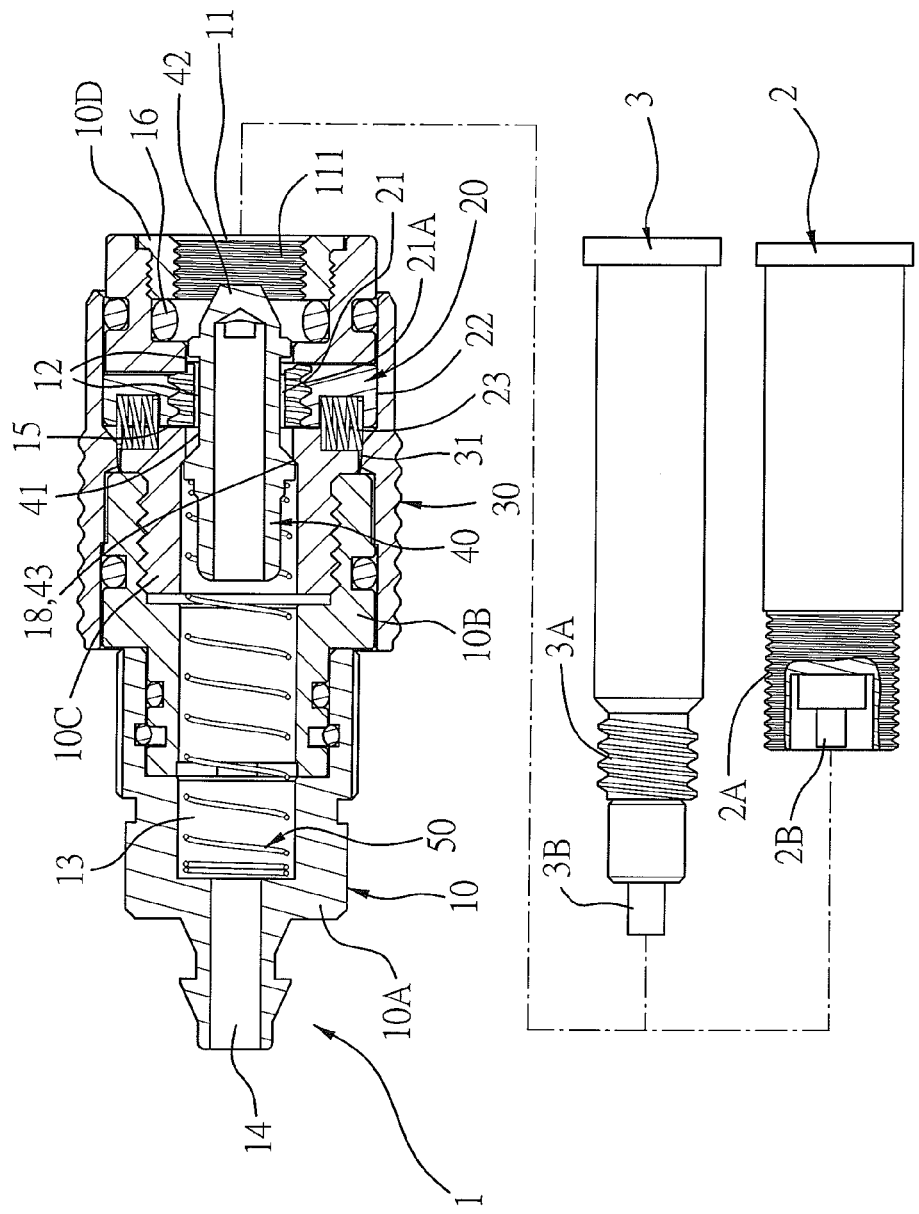
FIG. 3 is a cross sectional view showing the assembly of the connector structure for the Schrader (American) valve or the Presta (French) valve according to the preferred embodiment of the present invention.

With reference to FIGS. 1-3, an air connector 1 according to a preferred embodiment of the present invention is connected with a Schrader (American) valve 2 or a Presta (French) valve 3 to inflate the air, the Schrader (American) valve 2 includes Schrader (American) threads 2A arranged around an outer peripheral side thereof and a Schrader (American) inlet part 2B disposed on an end portion thereof; the Presta (French) valve 3 includes Presta (French) threads 3A arranged around an outer peripheral side thereof and a Presta (French) inlet part 3B disposed on an end portion thereof. The air connector 1 comprises:

a body 10, and the body 10 including a Schrader (American) inserting hole 11 mounted on one end thereof and having a Schrader (American) screwing section 111, a Presta (French) inserting hole 12, an outer diameter of which is less than an outer diameter of the Schrader (American) inserting hole 11, and the Presta (French) inserting hole 12 being spaced a distance away from an inner end of the Schrader (American) inserting hole 11; the body 10 also including a movable groove 13 communicating with the Presta (French) inserting hole 12, an air intake 14 communicating with the Schrader (American) inserting hole 11, the Presta (French) inserting hole 12 and the movable groove 13, at least one through orifice 15 defined around an outer side of the Presta (French) inserting hole 12 and passing through the Presta (French) inserting hole 12, and an O ring 16 formed between the Schrader (American) inserting hole 11 and the Presta (French) inserting hole 12;

a limiting block 20 matching with and fixed in the at least one through orifice 15 and moving into or out of the at least one through orifice 15, the limiting block 20 including a retaining segment 21 correspond to the Presta (French) inserting hole 12 and having plural locking teeth 21A for engaging with the includes Presta (French) threads 3A of the Presta (French) valve 3, a defining segment 22 secured thereon, and a pushing spring 23 defined between the limiting block 20 and the body 10 and pushing the limiting block 20 to move away from the Presta (French) inserting hole 12;

a control set 30 disposed on the body 10 and controlling the defining segment 22 of the limiting block 20 so that the plural locking teeth 21A of the retaining segment 21 of the limiting block 20 moves in or away from the Presta (French) inserting hole 12; the control set 30 being rotatable, formed in a ring shape, and fitted with the body 10; the control set 30 including a pressing protrusion 31 and a slidable slot 32 located above the pressing protrusion 31 and corresponding to a sliding rail 17 of the body 10, such that after slidable slot 32 slides out of the sliding rail 17, the control set 30 limits a movement of the defining segment 22 of the limiting block 20 by using the pressing protrusion 31;

a stopping rod 40 mounted in and limited by the movable groove 13 of the body 10, the stopping rod 40 including a confining slot 41 and an abutting segment 42 which are fixed in the movable groove 13, limited to move between the air intake 14 and the Schrader (American) inserting hole 11, and correspond to the Schrader (American) inserting hole 11, such that the stopping rod 40 is provided to flow the air, and the abutting segment 42 also corresponds to the Schrader (American) inlet part 2B;

a spring 50 secured between the movable groove 13 of the body 10 and the stopping rod 40; wherein the movable groove 13 has a shoulder 18 adjacent to the Presta (French) inserting hole 12, the stopping rod 40 further includes a flange 43, when the stopping rod 40 moves in the movable groove 13, the flange 43 of the stopping rod 40 contacts with the shoulder 18 so that the stopping rod 40 cannot move forward.

Figure 4:
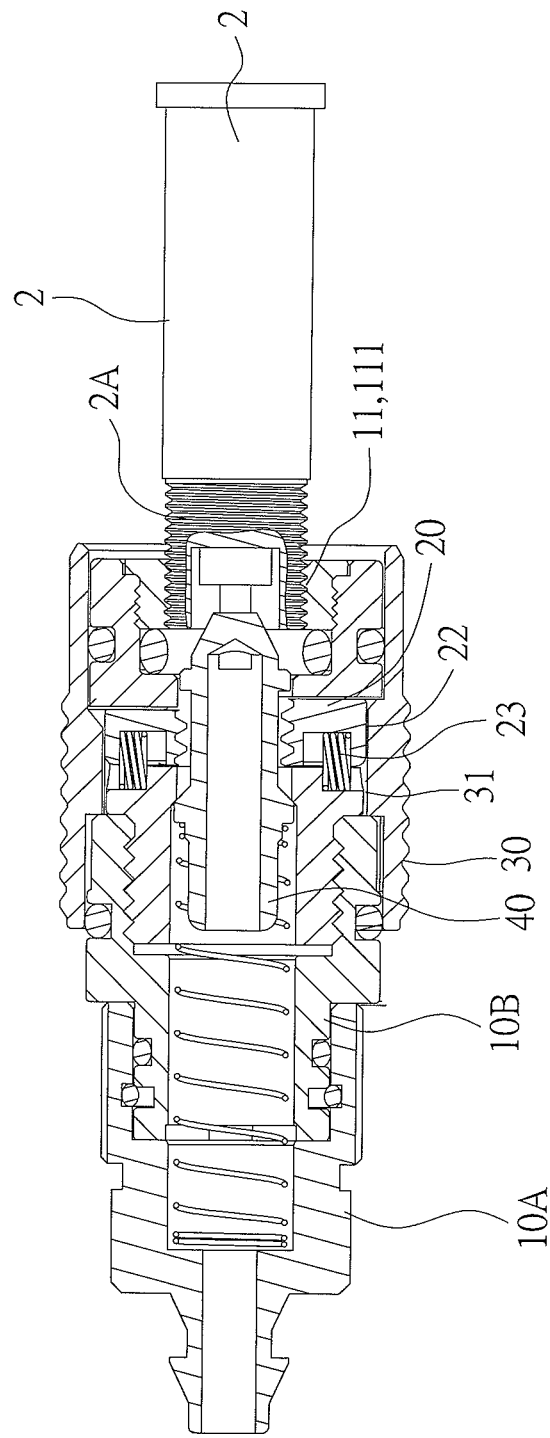
FIG. 4 is a cross sectional view showing an air connector being connected with a Schrader (American) valve according to the preferred embodiment of the present invention.

Referring to FIG. 4, when the air connector 1 is connected with the Schrader (American) valve 2 to inflate the air, the stopping rod 40 is pushed by the spring 50 to move toward the Schrader (American) inserting hole 11 so that the locking teeth 21A of the retaining segment 21 of the limiting block 20 move into the Presta (French) inserting hole 12 and engage with the confining slot 41, and the defining segment 22 of the limiting block 20 is limited by the control set 30 to prevent the retaining segment 21 moving away from the confining slot 41, when the Schrader (American) threads 2A of the Schrader (American) valve 2 are rotatably engaged in the Schrader (American) inserting hole 11 of the body 10, the Schrader (American) inlet part 2B is opened by the abutting segment 42 of the stopping rod 40 so that the Schrader (American) valve 2 inflates the air.

Figure 5:
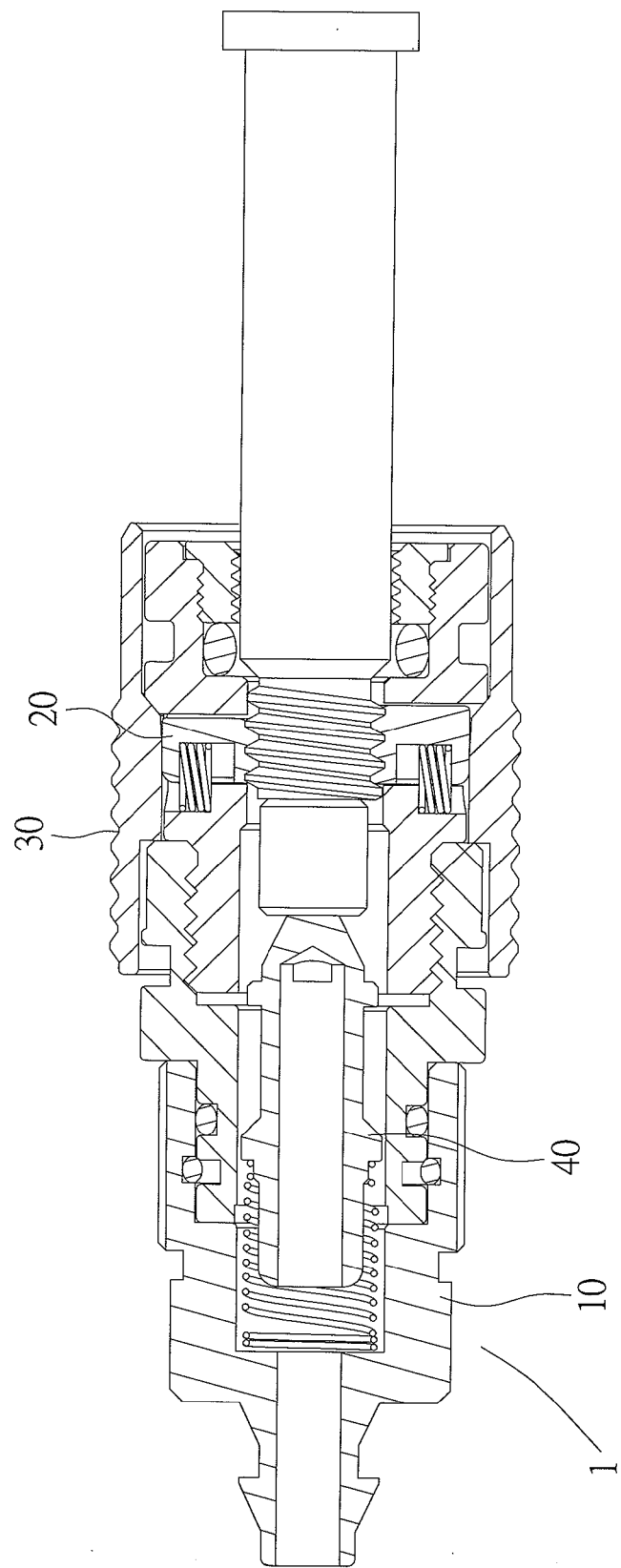
FIG. 5 is a cross sectional view showing an air connector being connected with a Presta (French) valve according to the preferred embodiment of the present invention.

As shown in FIG. 5, when the air connector 1 is connected with the Presta (French) valve 3 to inflate the air, the Presta (French) valve 3 couples with the Presta (French) inserting hole 12 of the body 10 so that the Presta (French) threads 3A engage with the locking teeth 21A of the limiting block 20, the stopping rod 40 is pushed by the Presta (French) valve 3 to move backward, the defining segment 22 of the limiting block 20 is limited by the control set 30 to prevent the locking teeth 21A disengagement from the Presta (French) threads 3A, and the Presta (French) threads 3A is opened by air inflating pressure so that the air is inflated into the Presta (French) valve 3.

When the spring 50 does not operate, the stopping rod 40 is forced by air pressure to move toward the Schrader (American) inserting hole 11.

The body 10 is comprised of a first coupling part 10A, a second coupling part 10B, a third coupling part 10C, and a fourth coupling part 10D, wherein the first coupling part 10A connects with the second coupling part 10B, the second coupling part 10B connects with the third coupling part 10C, and the third coupling part 10C connects with the fourth coupling part 10D. The air intake 14 is located at the first coupling part 10A, the movable groove 13 is defined between the second coupling part 10B and the third coupling part 10C, the Presta (French) inserting hole 12 and the at least one through orifice 15 are located at the third coupling part 10C, and the Schrader (American) inserting hole 11 is located at the fourth coupling part 10D.

Conventionally, when the air connector 1 is connected with the Presta (French) valve 3 to inflate the air, a user has to hold a tire with one hand, and the Presta (French) inserting hole 12 of the body 10 is joined with the Presta (French) valve 3 with the other hand. However, after the Presta (French) inserting hole 12 of the body 10 is joined with the Presta (French) valve 3, the control set 30 is moved so that the Presta (French) threads 3A engage with the locking teeth 21A, thus inflating the air by ways of the Presta (French) valve 3. Accordingly, the air connector 1 is operated with one hand easily. In contrast, the conventional air connector for the Presta (French) valve and the Schrader (American) valve is operated with two hands troublesomely.

After inflating the air by means of the Schrader (American) valve 2, the control set 30 is removed so that the stopping rod 40 stops pressing Schrader (American) inlet part 2B, and the air stops flowing into the Schrader (American) inlet part 2B. In the meantime, the Schrader (American) threads 2A engage with the Schrader (American) screwing section 111 tightly, thus avoiding pressure loss in an air inflating process and inflating the air into a tire by using the Schrader (American) valve 2 exactly, as illustrated in FIGS. 4 to 9.

The air connector 1 of the present invention has advantages as follows:

1. The air connector 1 is connected with the Schrader (American) valve 2 or the Presta (French) valve 3 to inflate the air easily by using the stopping rod 40.

2. The air connector 1 is connected with the Schrader (American) valve 2 or the Presta (French) valve 3 to inflate the air. When the air connector 1 is connected with the Presta (French) valve 3, the plural locking teeth 21A engage with or disengage from the limiting block 20 quickly.

Figure 8:
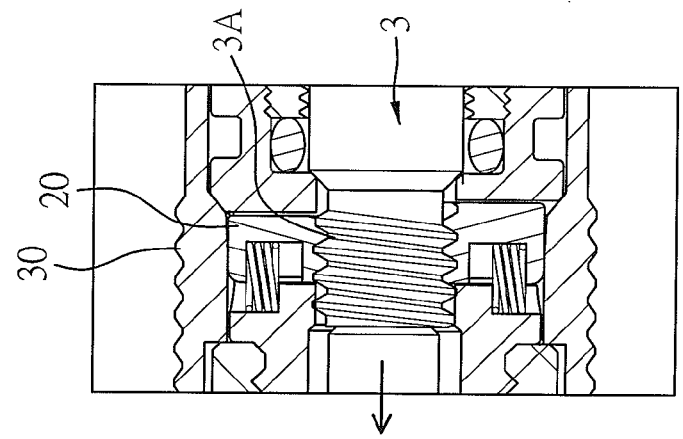
FIG. 8 is also another cross sectional view showing the plural locking teeth engaging with the Presta (French) threads according to the preferred embodiment of the present invention.
Figure 7:
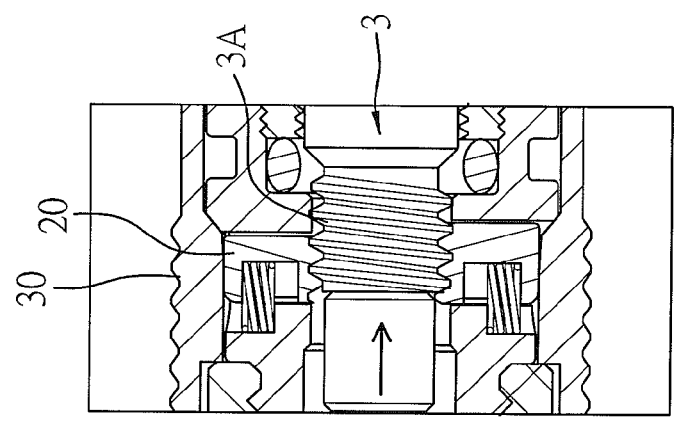
FIG. 7 is another cross sectional view showing the plural locking teeth engaging with the Presta (French) threads according to the preferred embodiment of the present invention.
Figure 6:
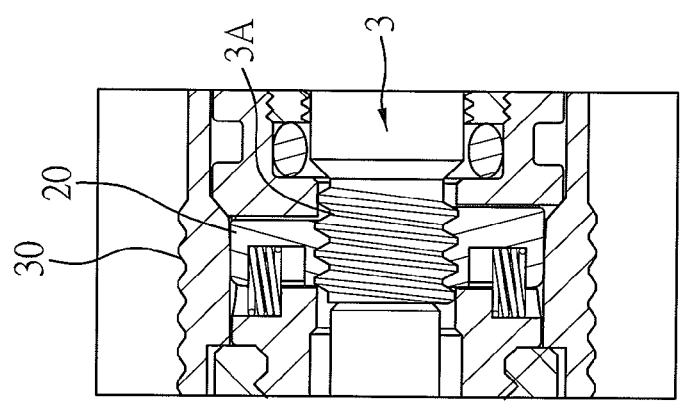
FIG. 6 is a cross sectional view showing plural locking teeth engaging with Presta (French) threads according to the preferred embodiment of the present invention.
Figure 9:
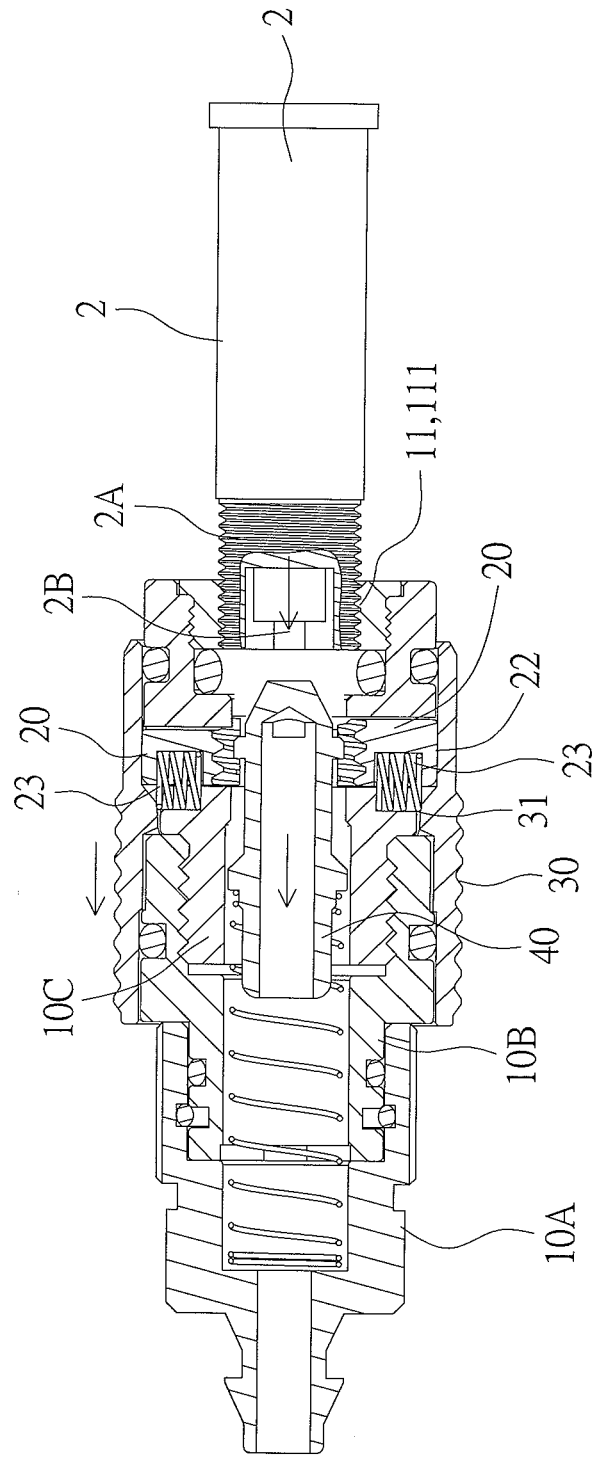
FIG. 9 is still another cross sectional view showing the plural locking teeth engaging with the Presta (French) threads according to the preferred embodiment of the present invention.
Figure 10:
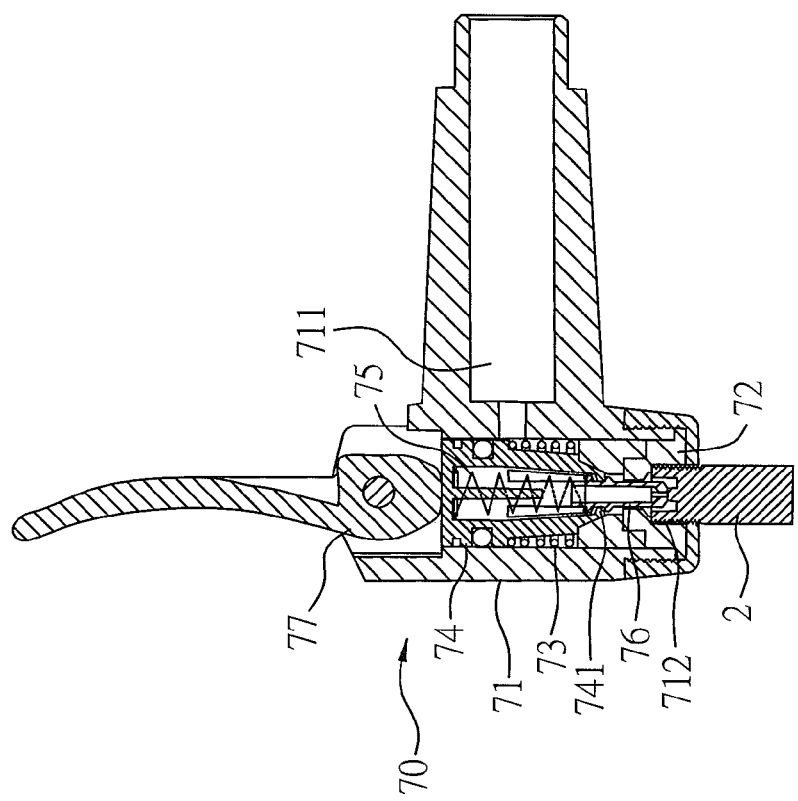
FIG. 10 is a cross sectional view showing a conventional air connector being connected with a Presta (French) valve.
Figures 11, 12:
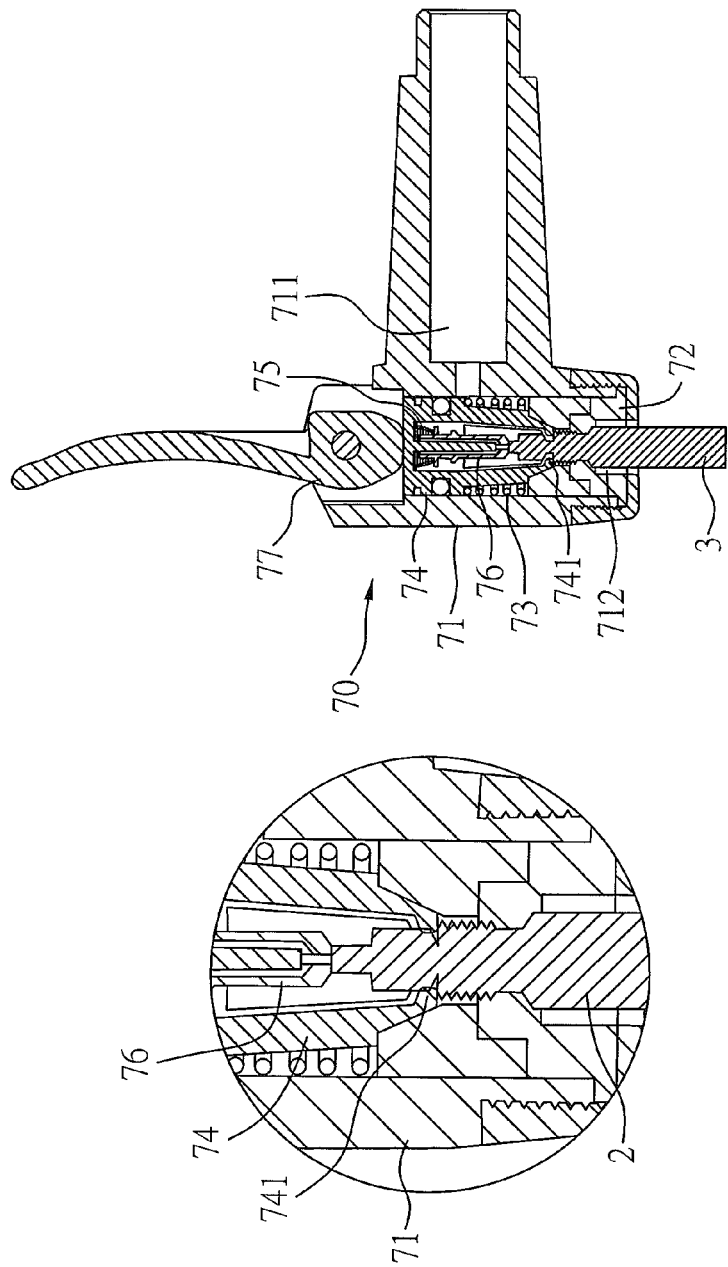
FIG. 11 is another cross sectional view showing an ideal state of the conventional air connector being connected with the Presta (French) valve.
FIG. 12 is another cross sectional view showing an actual state of the conventional air connector being connected with the Presta (French) valve.

3. Conventionally, a size of the Presta (French) valve 3 is small and is produced by many manufacturers, so lengths and depths of the Presta (French) threads 3A produced by many manufacturers are different. Nevertheless, the locking teeth 21A of the present invention engage with the Presta (French) threads 3A of various lengths quickly and tightly, as shown in FIGS. 6 to 8.

While various embodiments in accordance with the present invention have been shown and described, it is clear to those skilled in the art that further embodiments may be made without departing from the scope of the present invention.

What is claimed is:

1. A connector structure for a Schrader (American) valve or a Presta (French) valve comprising an air connector connected with a Schrader (American) valve or a Presta (French) valve to inflate the air, the Schrader (American) valve including Schrader (American) threads arranged around an outer peripheral side thereof and a Schrader (American) inlet part disposed on an end portion thereof; the Presta (French) valve including Presta (French) threads arranged around an outer peripheral side thereof and a Presta (French) inlet part disposed on an end portion thereof, and the air connector comprising:

a body, and the body including a Schrader (American) inserting hole mounted on one end thereof and having a Schrader (American) screwing section, a Presta (French) inserting hole, an outer diameter of which is less than an outer diameter of the Schrader (American) inserting hole, and the Presta (French) inserting hole being spaced a distance away from an inner end of the Schrader (American) inserting hole; the body also including a movable groove communicating with the Presta (French) inserting hole, an air intake communicating with the Schrader (American) inserting hole, the Presta (French) inserting hole and the movable groove, at least one through orifice defined around an outer side of the Presta (French) inserting hole and passing through the Presta (French) inserting hole;

a limiting block matching with and fixed in the at least one through orifice and moving into or out of the at least one through orifice, the limiting block including a retaining segment correspond to the Presta (French) inserting hole and having plural locking teeth for engaging with the includes Presta (French) threads of the Presta (French) valve, and a defining segment secured on the limiting block;

a control set disposed on the body and controlling the defining segment of the limiting block, so the plural locking teeth of the retaining segment of the limiting block moves in or away from the Presta (French) inserting hole;

a stopping rod mounted in and limited by the movable groove of the body, the stopping rod including a confining slot and an abutting segment which correspond to the Schrader (American) inserting hole, the stopping rod being provided to flow the air, and the abutting segment also corresponding to the Schrader (American) inlet part; wherein when the air connector is connected with the Schrader (American) valve to inflate the air, the stopping rod is pushed to move toward the Schrader (American) inserting hole, the retaining segment of the limiting block moves into the Presta (French) inserting hole and engages with the confining slot, and the defining segment of the limiting block is limited by the control set to prevent the retaining segment moving away from the confining slot, when the Schrader (American) threads of the Schrader (American) valve are rotatably engaged in the Schrader (American) inserting hole of the body, the Schrader (American) inlet part is opened by the abutting segment of the stopping rod so that the Schrader (American) valve inflates the air;

when the air connector is connected with the Presta (French) valve to inflate the air, the Presta (French) valve couples with the Presta (French) inserting hole of the body, the Presta (French) threads engage with the locking teeth of the limiting block, the stopping rod is pushed by the Presta (French) valve to move backward, the defining segment of the limiting block is limited by the control set to prevent the locking teeth disengagement from the Presta (French) threads, and the Presta (French) threads is opened by air inflating pressure so that the air is inflated into the Presta (French) valve.

2. The connector structure for the Schrader (American) valve or the Presta (French) valve as claimed in claim 1, wherein the stopping rod is forced by air pressure to move toward the Schrader (American) inserting hole.

3. The connector structure for the Schrader (American) valve or the Presta (French) valve as claimed in claim 1, wherein a spring is secured between the movable groove of the body and the stopping rod, the stopping rod is pushed by the spring to move toward the Schrader (American) inserting hole.

4. The connector structure for the Schrader (American) valve or the Presta (French) valve as claimed in claim 1, wherein an O ring is formed between the Schrader (American) inserting hole and the Presta (French) inserting hole.

5. The connector structure for the Schrader (American) valve or the Presta (French) valve as claimed in claim 1, wherein the movable groove has a shoulder adjacent to the Presta (French) inserting hole, the stopping rod further includes a flange, when the stopping rod moves in the movable groove, the flange of the stopping rod contacts with the shoulder so that the stopping rod cannot move forward.

6. The connector structure for the Schrader (American) valve or the Presta (French) valve as claimed in claim 1, wherein the body is comprised of a first coupling part, a second coupling part, a third coupling part, and a fourth coupling part, wherein the first coupling part connects with the second coupling part, the second coupling part connects with the third coupling part, and the third coupling part connects with the fourth coupling part; the air intake is located at the first coupling part, the movable groove is defined between the second coupling part and the third coupling part, the Presta (French) inserting hole and the at least one through orifice are located at the third coupling part, and the Schrader (American) inserting hole is located at the fourth coupling part.

7. The connector structure for the Schrader (American) valve or the Presta (French) valve as claimed in claim 1, wherein a pushing spring is defined between the limiting block and the body and pushes the limiting block to move away from the Presta (French) inserting hole.

8. The connector structure for the Schrader (American) valve or the Presta (French) valve as claimed in claim 1, wherein the control set is rotatable, formed in a ring shape, and fitted with the body; the control set includes a pressing protrusion and a slidable slot located above the pressing protrusion and corresponding to a sliding rail of the body, and after slidable slot slides out of the sliding rail, the control set limits a movement of the defining segment of the limiting block by using the pressing protrusion.

\* \* \* \* \*